3,164,436
PROCESS FOR DYEING OR PRINTING HYDRO-
PHOBIC FIBROUS MATERIALS
Hans Altermatt, Reinach, Basel-Land, Switzerland, assignor to Ciba Limited, Basel, Switzerland, a company of Switzerland
No Drawing. Filed Jan. 24, 1962, Ser. No. 168,547
Claims priority, application Switzerland, Jan. 31, 1961, 1,149/61
6 Claims. (Cl. 8—39)

The present invention is based on the observation that valuable dyeings and prints can be produced on hydrophobic fibrous materials made, for example, of cellulose esters, such as cellulose-2½-acetate or cellulose triacetate, polyesters, especially polyethylene terephthalate, polyamides, polyurethanes, polyacrylonitrile or polyvinyl chloride, by using as dyestuffs arylmercapto-anthraquinones of which one benzene ring contains an arylmercapto group and may also contain a substituent not imparting solubility in water and the other benzene ring is unsubstituted or contains an arylmercapto group.

The dyestuffs used in the process advantageously contain at least one arylmercapto group in an α-position of the anthraquinone nucleus. As is apparent from the above definition the dyestuffs are free from substituents which impart solubility in water such as sulphonic acid groups and carboxylic acid groups.

Examples of arylmercapto groups are α- and β-naphthylmercapto groups, and especially phenylmercapto groups of which the phenyl group may contain substituents, such as halogen atoms, lower alkyl, hydroxyalkyl, alkoxyalkyl or alkoxy groups or hydroxyl, amino, nitro, cyano or carbalkoxy groups.

The dystuffs may contain in the benzene ring of the anthraquinone nucleus which must contain an arylmercapo group, substituents not imparting solubility in water, for example, halogen atoms such as chlorine or bromine, or hydroxyl or alkoxy groups, alkyl or alkylmercapto groups, nitro or especially amino groups which latter term includes in addition to the —$NH_2$ group, alkylamino, cycloalkylamino, aralkylamino and arylamino groups. These substituents should preferably be in an α-position. Of special interest are dyestuffs having a substituted amino group in the 1-position, for example, an alkylamino or an acylamino group, and dyestuffs containing 1 or 2 arylmercapto groups in the anthraquinone nucleus and no other substituents.

The following are examples of dyestuffs to be used in the process of the invention:

1-phenylmercaptoanthraquinone,
1:5- or 1:8-diphenylmercaptoanthraquinone,
1-chloro-4-p-tolylmercaptoanthraquinone,
1-hydroxy-4-phenylmercaptoanthraquinone,
1-amino-4-phenylmercaptoanthraquinone,
  1-methylamino-4-phenylmercaptoanthraquinone,
1-hydroxyethylamino-4-phenylmercaptoanthraquinone,
1-phenylamino-4-phenylmercaptoanthraquinone,
1-acetylamino-4-phenylmercaptoanthraquinone,
1-amino-2:4-diphenylmercaptoanthraquinone,
2-amino-1-phenylmercapto-3-bromoanthraquinone,
1-(p-dimethylaminophenyl)-mercaptoanthraquinone.

These dyestuffs are obtained, for example, by reacting a nitro- or halogen-anthraquinone with an arylmercaptan by a known method.

In certain cases it may be of advantage to use a mixture of two or more of these dyestuffs in the process.

For dyeing, the said dyestuffs are preferably used in a finely divided form and in the presence of a dispersing agent such as sulphite cellulose waste liquor or a synthetic detergent, or a combination of different wetting and dispersing agents. Before dyeing, it is generally of advantage to convert the dyestuff or dyestuffs to be used into a dyestuff preparation which contains a dispersing agent and the finely divided dyestuff(s) in such a form as to yield a fine dispersion when the preparation is diluted with water. Dyestuff preparations of this kind can be made by known methods, for example by grinding the dyestuff(s) either in dry or wet form with or without the addition of a dispersing agent.

It is of advantage to add a carrier to the dyebath in order to obtain strong dyeings on polyethylene terephthalate fibers, or to carry out the dyeing operation under pressure at a temperature above 100° C., for example at 120° C. Suitable carriers are aromatic carboxylic acids, for example benzoic acid or salicylic acid, phenols such as ortho- or para-hydroxydiphenyl, aromatic halogen compounds, for example, chlorobenzene, ortho-dichlorobenzene or trichlorobenzene, phenylmethylcarbinol or diphenyl. In dyeing under pressure it is of advantage to render the dyebath slightly acid by adding, for example, a weak acid such as acetic acid.

The dyestuffs used in the process of the invention are especially suitable for dyeing by the so-called thermofixation method, in which the fabric to be dyed is impregnated advantageously at a temperature not exceeding 60° C. with an aqueous dispersion of the dyestuff, which contains 1 to 50% of urea and a thickening agent, especially sodium alginate, and the fabric is squeezed in the usual manner. The squeezing is preferably carried out so that the goods retain 50 to 100% of their weight of dye liquor.

The dyestuff is fixed by subjecting the impregnated fabric to a heat treatment at temperatures above 100° C., for example, at a temperature ranging from 180° C. to 210° C., it being of advantage to dry the fabric prior to this treatment, for example, in a current of warm air.

The thermofixation mentioned above is of special interest for the dyeing of mixed fabrics of polyester fibers and cellulose fibers, especially cotton. In this case, in addition to the dyestuff to be used in the process of the invention, the padding liquor contains a dyestuff suitable for dyeing cotton, for example a direct dyestuff or vat dyestuff, or more especially a so-called reactive dyestuff, i.e. a dyestuff capable of being fixed on cellulose fibers with the formation of a chemical bond, for example, a dyestuff containing a chlorotriazine or chlorodiazine residue. In the latter case it is of advantage to add to the padding liquor an agent capable of binding acid, for example, an alkali carbonate, alkali phosphate, alkali borate or alkali perborate, or a mixture of two or more of these agents. When vat dyestuffs are used the padded fabric must be treated, after the heat treatment, with an aqueous alkaline solution of a reducing agent of the kind used in vat dyeing.

The dyeings produced on polyester fibers by the process of the invention are advantageously given an after-treatment, for example, by heating them with an aqueous solution of a non-ionic detergent.

The process is also suitable for dyeing mixed fabrics of polyester fibers and wool and the wool portion which remains reserved, may be subsequently dyed with a wool dyestuff.

Instead of applying the dyestuffs in the process by impregnation, they may be applied by printing. For this purpose, a printing colour is used which in addition to the usual printing assistants such as wetting and thickening agents, contains the finely dispersed dyestuff, if desired, in admixture with one of the aforesaid cotton dyestuffs, and if desired, in the presence of urea and/or an agent capable of binding acid.

There are obtained by the process of the invention strong dyeing or prints having excellent fastness properties, especially a good fastness to light, sublimation, decatizing, washing and chlorine water. The dyeings on cellulose acetate rayon also possess a good fastness to gases of combustion. A further advantage is the good reservation of wool and cotton attained with the dyestuffs used in this process.

The following examples illustrate the invention, the parts and percentages being by weight unless otherwise stated, and the relationship of parts by weight to parts by volume being the same as that of the kilogram to the liter:

Example 1

0.5 part of 1-phenylmercaptoanthraquinone is ground with 0.5 part of 2:2'-dinaphthylmethane disulphonic acid to form a fine dispersion. The dispersion is added to a dyebath containing 3 parts of glacial acetic acid and 3 parts of N-benzyl-μ-heptadecyl-benzimidazolesulphonic acid in 3000 parts of water. 100 parts of well wetted cellulose acetate rayon are entered at 40° C., the temperature is raised to 80° C., and dyeing is continued for 1 hour at 80° C. The cellulose acetate rayon is dyed a pure yellow tint and the dyeing exhibits good fastness to light.

A bluish red dyeing of good fastness is obtained by using 1-phenylmercapto-4-benzylaminoanthraquinone as dyestuff.

Example 2

1 part of 1-amino-4-phenylmercaptoanthraquinone pasted with a fatty alcohol-ethylene oxide condensation product is diluted to 4000 parts with water, and 1.6 parts of glacial acetic acid and 1 part of a fatty alcohol-ethylene oxide condensation product are added. 100 parts of cellulose triacetate fabric are entered into the dyebath at 30° C., the bath is brought to the boil, the dyeing is carried on at the boil for 1 hour. A pink dyeing of good fastness to light and sublimation is obtained.

Example 3

1 part of an aqueous paste of 1-phenylmercaptoanthraquinone is ground in a roller mill with approximately 1 part of dried sulphite waste liquor to form a fine paste having a dyestuff content of approximately 10%.

100 parts of a fibrous material of polyethylene terephthalate is washed for half an hour in a bath containing in 1000 parts of water, 1 to 2 parts of the sodium salt of N-benzyl-μ-heptadecyl-benzimidazole disulphonic acid and 1 part of a concentrated aqueous solution of ammonia. The material is then entered into a dyebath of 3000 parts of water in which the dyestuff paste prepared as described in the preceding paragraph is dispersed with the addition of 4 parts of the sodium salt of N-benzyl-μ-heptadecyl-benzimidazole disulphonic acid. The whole is then heated to 120° C. in a pressure vessel and maintained at this temperature for approximately half an hour. The material is then thoroughly rinsed and, if necessary, washing for half an hour at 60° C. to 80° C. in a solution containing, in 1000 parts of water, 1 part of the sodium salt of N-benzyl-μ-heptadecyl-benzimidazole disulphonic acid. A pure yellow dyeing of excellent fastness to sublimation and light is obtained.

Further dyestuffs, which dye polyethylene terephthalate fibers by the process described above, are given in column I in the following table, and the tints they yield are given in column II.

| No. | I | II |
|---|---|---|
| 1 | 1-amino-4-phenylmercaptoanthraquinone | Bluish red. |
| 2 | 1-methylamino-4-phenylmercaptoanthraquinone | Violet. |
| 3 | 1:5-diphenylmercaptoanthraquinone | Reddish yellow. |
| 4 | 1-amino-2:4-diphenylmercaptoanthraquinone | Reddish violet. |
| 5 | 1-amino-2-methyl-4-phenylmercaptoanthraquinone | Pink. |
| 6 | 1-amino-2-bromo-4-phenylmercaptoanthraquinone | Ruby red. |
| 7 | 1-amino-2-cyano-4-phenylmercaptoanthraquinone | Bluish red. |
| 8 | 1-amino-2-(β-methoxyethoxy)-4-phenylmercaptoanthraquinone | Red. |
| 9 | 1-anilido-4-phenylmercaptoanthraquinone | Blue. |
| 10 | 1-acetylamino-4-p-tolylmercaptoanthraquinone | Orange. |
| 11 | 1-(p-dimethylaminophenyl)-mercaptoanthraquinone | Orange. |

Dyestuff No. 6 was obtained as follows:

15.2 parts of 1-amino-2:4-dibromoanthraquinone were stirred for 15 hours under reflux in a solution of 4.4 parts of thiophenol and 2.3 parts of potassium hydroxide in 300 parts volume of ethanol (96% strength by volume). When cold, the 1-amino-2-bromo-4-phenylmercaptoanthraquinone, which precipitated in the form of dark red crystals, was filtered off, thoroughly washed with water and dried in vacuo at 70° C.

Dyestuff No. 7 was obtained as follows:

5.3 parts of 1-amino-4-phenylmercaptoanthraquinone-2-sulphonic acid (sodium salt) in 140 parts of water were heated with 8 parts of sodium cyanide and 4 parts of ammonium bicarbonate. The 1-amino-2-cyano-4-phenylmercapto-anthraquinone so formed was filtered off and washed neutral with water.

Example 4

100 parts of a fibrous material of polyethylene terephthalate are washed for half an hour in a bath containing in 1000 parts of water, 1 to 2 parts of the sodium salt of N-benzyl-μ-heptadecyl-benzimidazole disulphonic acid and 1 part of a concentrated aqueous solution of ammonia. The material is then entered into a dyebath containing, in 3000 parts of water, 9 parts of diammonium phosphate and 1.5 parts of the sodium salt of N-benzyl-μ-heptadecyl-benzimidazole disulphonic acid, and treated therein for 15 minutes at 50° C. 9 parts of sodium ortho-phenyl-phenolate are then gradually added, and the liberated ortho-phenyl-phenol is absorbed by agitating the textile material for 15 minutes at 50 to 55° C. A dyestuff paste prepared as described in Example 3, paragraph 1, is then added. The bath is then brought to the boil in the course of 30 to 45 minutes, and dyeing is continued for 1 to 1½ hours as close to the boil as possible. The material is then thoroughly rinsed and, if necessary, washed for half an hour at 60 to 80° C. in a solution containing, in 1000 parts of water, 1 part of the sodium salt of N-benzyl-μ-heptadecyl-benzimidazole disulphonic acid. A yellow dyeing of excellent fastness to sublimation and light is obtained.

Example 5

The following are mixed together:

300 parts of gum arabic (1:1)
300 parts of crystal gum (1:2)
250 parts of water
40 parts of thiodiglycol
50 parts of a solution of 10% strength of the sodium salt of meta-nitrobenzene sulphonic acid
20 parts of a mixture of potassium oleate and pine oil
1000 parts 200 parts of a dyestuff paste prepared as described in Example 3, paragraph 1, are stirred in 800 parts of the above stock thickening by means of a high-speed stirrer until dispersion is complete. The polyethyleneterephthalate fabric is printed with this paste. After printing, the fabric is dried, steamed for 45 minutes under 0.75 atmosphere (gauge), rinsed in cold water for 10 minutes, centrifuged and dried. A fast yellow print is obtained.

*Example 6*

200 parts urea and 20 parts of the dyestuff of the formula

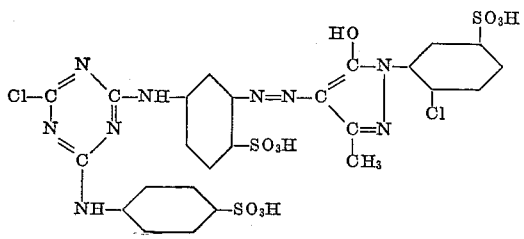

are dissolved by boiling in 400 parts water. To the solution are added 100 parts of an aqueous dispersion containing 30 parts of 1-phenylmercaptoanthraquinone and 2 parts of the sodium salt of di-isobutyl-naphthalene sulphonic acid, the whole well mixed for a few minutes by means of a high speed stirrer, during which operation 100 parts of a sodium carbonate solution of 20% strength and 400 parts of a sodium alginate solution of 50% strength, are added.

A mixed fabric of 35 parts of cotton and 65 parts of polyethylene terephthalate fibers is padded with the above padding liquor at 50 to 60° C., so that the fabric retains 65 to 70% of its weight of the liquor. It is then dried and subjected to a heat treatment for 1 minute at 200 to 210° C.

It is then washed at the boil for 20 minutes in a solution containing, per liter, 2 grams of a non-ionic detergent and 2 grams of calcinated sodium carbonate, and then rinsed and dried. A pure yellow dyeing having very good properties of fastness is obtained.

*Example 7*

100 parts of a mixed fabric of 50 parts of a fibrous material of polyethylene terephthalate and 50 parts of wool are entered into a bath at 50° C. containing, in 1000 parts of water, 5 parts of an aqueous emulsion of 75% strength of salicylic acid methyl ester as accelerator, 1 part of the sodium salt of di-isobutyl-naphthalene sulphonic acid and 10 parts of 1-phenylmercapto-anthraquinone. The bath is brought to the boil in the course of 1 hour, boiling is continued for 1½ to 2 hours, and the dyed material then thoroughly rinsed with warm water. After-cleaning is not necessary. The polyester fibers are dyed a strong yellow tint, whereas the wool remains almost white.

*Example 8*

1 part of 1-amino-4-phenylmercaptoanthraquinone is ground wet with 2 parts of an aqueous solution of 50% strength of sulphite cellulose waste liquor, and then dried.

The resulting dyestuff preparation is stirred with 100 parts of an aqueous solution of 10% strength of a condensation product of octadecyl alcohol with 20 mols of ethylene oxide, and 4000 parts of dyebath are prepared by diluting with water.

100 parts of a polyamide fabric are entered into the cold dyebath, the temperature is raised to 90° C. within ½ hour, and dyeing is continued at this temperature for 1 hour. A strong pink dyeing of good fastness to light and washing is obtained.

What is claimed is:

1. A process for dyeing and printing hydrophobic textile material, wherein there is used as dyestuff an aryl-mercaptoanthraquinone of the formula

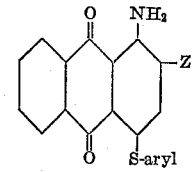

wherein aryl is phenyl, and Z is a member selected from the group consisting of hydrogen, bromine, methyl, lower alkoxyalkoxy and cyano.

2. A process for dyeing and printing hydrophobic textile material, wherein there is used as dyestuff an aryl-mercaptoanthraquinone of the formula

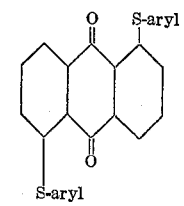

in which aryl is phenyl.

3. A process for dyeing and printing hydrophobic textile material, wherein there is used as dyestuff an aryl-mercaptoanthraquinone of the formula

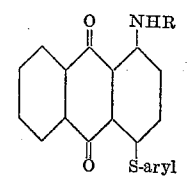

in which aryl is phenyl and R lower aliphatic acyl.

4. A process for dyeing and printing polyethylene terephthalate textile material wherein there is used the dyestuff of the formula

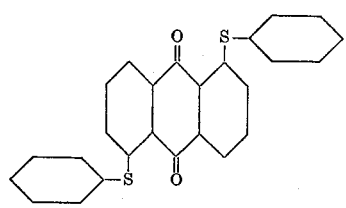

5. Polyethylene terephthalate textile material dyed with the dyestuff of the formula

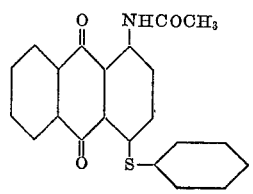

6. Polyethylene terephthalate textile material dyed with the dyestuff of the formula
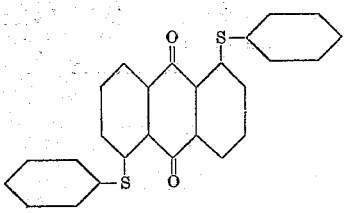
References Cited in the file of this patent
UNITED STATES PATENTS
| | | |
|---|---|---|
| 1,062,990 | Nawiasky | May 27, 1913 |
| 1,985,287 | Hulton et al. | Dec. 25, 1934 |
| 2,109,464 | Cantrell et al. | Mar. 1, 1938 |
| 3,018,154 | Downey et al. | Jan. 23, 1962 |
OTHER REFERENCES
Gunthard: Amer. Dyestuff Reporter, Jan. 14, 1957, pp. 9–21.